United States Patent [19]
Fukami et al.

[11] Patent Number: 5,313,339
[45] Date of Patent: May 17, 1994

[54] APPARATUS USING A ROTARY HEAD FOR RECORDING DIGITAL VIDEO AND AUDIO SIGNALS AT DOUBLE SPEED

[75] Inventors: Tadashi Fukami; Shinichi Fukuda, both of Kanagawa; Masayoshi Noguchi, Chiba; Makoto Yamada, Tokyo, all of Japan

[73] Assignee: Sony Corporation, Tokyo, Japan

[21] Appl. No.: 795,751

[22] Filed: Nov. 21, 1991

[30] Foreign Application Priority Data

Nov. 30, 1990 [JP] Japan .................. 02-339763

[51] Int. Cl.⁵ ............................................. G11B 5/02
[52] U.S. Cl. .................... 360/19.1; 360/10.3; 360/73.04
[58] Field of Search ............... 360/19.1, 18, 32, 73.04, 360/73.05, 73.06, 75, 8, 9.1, 10.1, 10.3, 73.01; 358/343, 338, 312, 321

[56] References Cited

U.S. PATENT DOCUMENTS

| 4,710,826 | 12/1987 | Sakurai | 360/9.1 |
| 5,065,259 | 11/1991 | Kubota et al. | 360/9.1 X |
| 5,136,391 | 8/1992 | Minami | 360/10.3 X |

FOREIGN PATENT DOCUMENTS

| 241014 | 4/1987 | European Pat. Off. | G11B 27/30 |
| 371456 | 11/1989 | European Pat. Off. | G11B 20/10 |
| 63-155877 | 6/1988 | Japan | H04N 5/92 |
| 1-272384 | 1/1990 | Japan | H04N 5/92 |
| 2-235486 | 12/1990 | Japan | H04N 5/92 |

Primary Examiner—Andrew L. Sniezek
Attorney, Agent, or Firm—Lewis H. Eslinger; Jay H. Maioli

[57] ABSTRACT

In a magnetic recording and reproducing apparatus, an audio signal and a video signal are assigned to first and a second channels of an ordinary magnetic recording and reproducing apparatus in respectively, and recorded at a transmission rate twice that of the usual rate, so that it is possible to record an audio signal without tone quality degradation to record a video signal together with the audio signal.

5 Claims, 3 Drawing Sheets

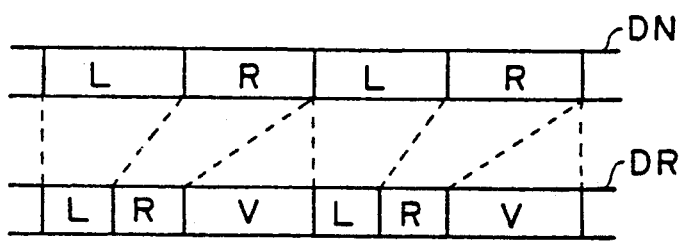
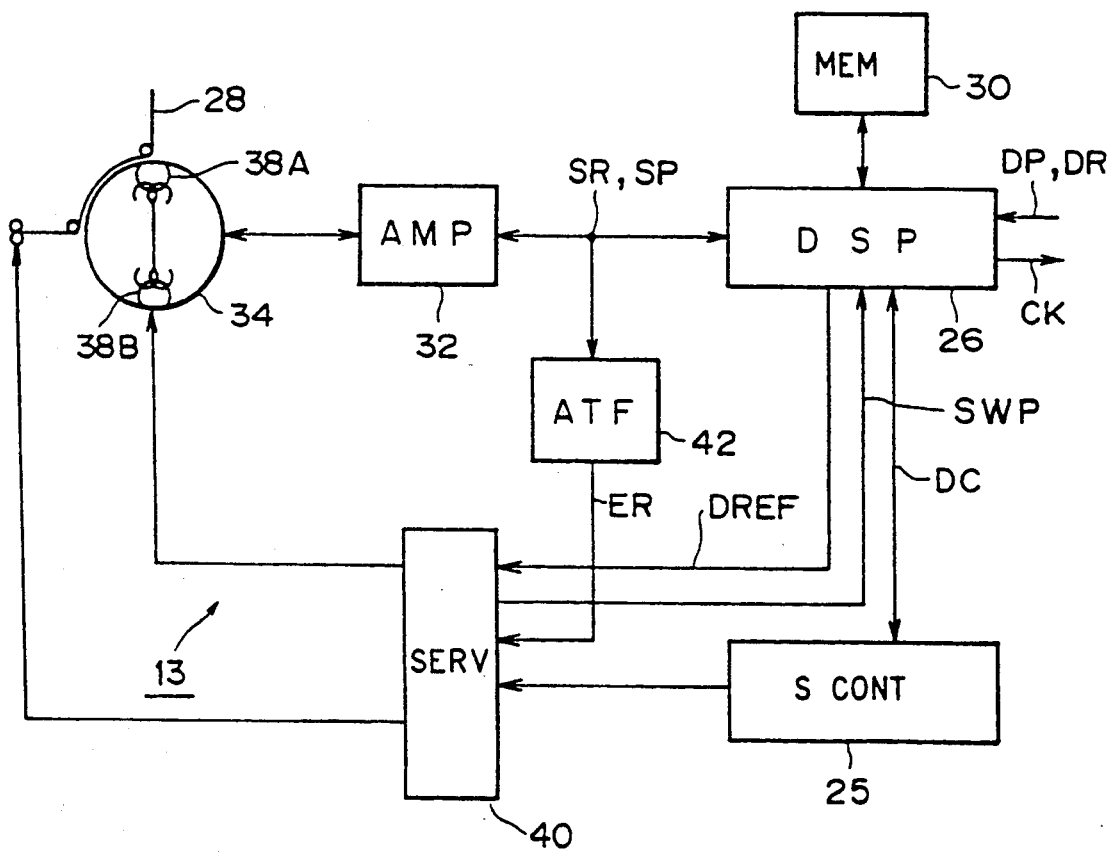
FIG.3

APPARATUS USING A ROTARY HEAD FOR RECORDING DIGITAL VIDEO AND AUDIO SIGNALS AT DOUBLE SPEED

BACKGROUND OF THE INVENTION

This invention relates to a digital signal recording apparatus using a rotary head, and more particularly to an improvement in recording a digital audio signal on the slanted recording tracks sequentially arranged on a magnetic tape.

There is known a magnetic recording apparatus, in which a digital audio signal is recorded thereon sequentially arranged slanted recording tracks on a magnetic tape using a rotary head (referred to as a digital audio tape recorder, hereinafter).

In such digital audio tape recorder, an audio signal is converted into a digital signal for recording or reproduction on the magnetic tape and can be recorded or reproduced effectively by avoiding tone quality degradation by means of execution of an error correcting procedure.

By the way, it is considered convenient if a video signal can be recorded together with the audio signal by this kind of digital audio tape recorder.

In such case, a method is considered for recording the audio signal and the video signal by compressing them. For the case of this method, there is a degradation problem of tone quality of the audio signal.

There is also a further problem of being impossible to obtain sufficient image quality since, in such case, an information amount of only 515-768 [kbps] which is newly obtained by compressing the information of the audio signal can be assigned to the video signal.

Further, when recording is performed in this manner, it is impossible to reproduce a magnetic tape on which signals are recorded by means of an ordinary digital audio tape recorder, because compressed information is recorded on the tape.

SUMMARY OF THE INVENTION

In view of the foregoing, an object of this invention is to provide a digital signal recording apparatus using a rotary head in which a digital audio signal and a digital video signal are recorded on a magnetic tape.

Another object of the invention is to provide a digital signal recording apparatus using a rotary head in which a digital audio signal and a digital video signal are recorded on a magnetic tape.

A further object of the invention is to provide a digital signal recording apparatus using a rotary head in which the digital video signal is recorded without tone quality degradation of the digital audio signal.

The foregoing objects and other objects of the invention have been achieved by the provision of a digital signal recording apparatus using a rotary head in which a digital audio signal DA1 and a digital video signal DV1 are recorded on recording tracks respectively being sequentially formed slanted on a magnetic tape 28 wound on a rotary drum 34 and running at a predetermined speed.

The rotary drum 34 is rotated at a rotation speed twice the rotation speed in an ordinary recording and the magnetic tape 28 runs at a running speed twice the running speed in the ordinary recording. The digital audio signal DA1 and the digital video signal DV1 are provided at a transmission rate twice the transmission rate in the ordinary recording for conversion into a recording signal SP, which then is recorded on the tracks formed on the magnetic tape 28.

By arranging the digital audio signal DA1 and the digital video signal DV1 using the first and second recording channels (L) and (R), respectively, and recording the digital audio signal DA1 and the digital video signal DV1 at a rate twice the ordinary transmission rate, it is possible to record the audio signal DA1 with the same tone quality as in the case of recording at the usual transmission rate.

Further, for the digital video signal DV1, it is possible to assign the same amount of information as that of the digital audio signal DA1 so that it is possible to record the digital video signal together with the digital audio signal.

In a magnetic recording and reproducing apparatus according to the present invention, it is also possible to reproduce the magnetic tape having been recorded by means of a rotary head rotating at an ordinary rotation speed.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2a and 2b show a format of recording signal thereof;

FIG. 3 is a block diagram showing a digital audio tape recorder;

DETAILED DESCRIPTION OF THE INVENTION

Figure 1:
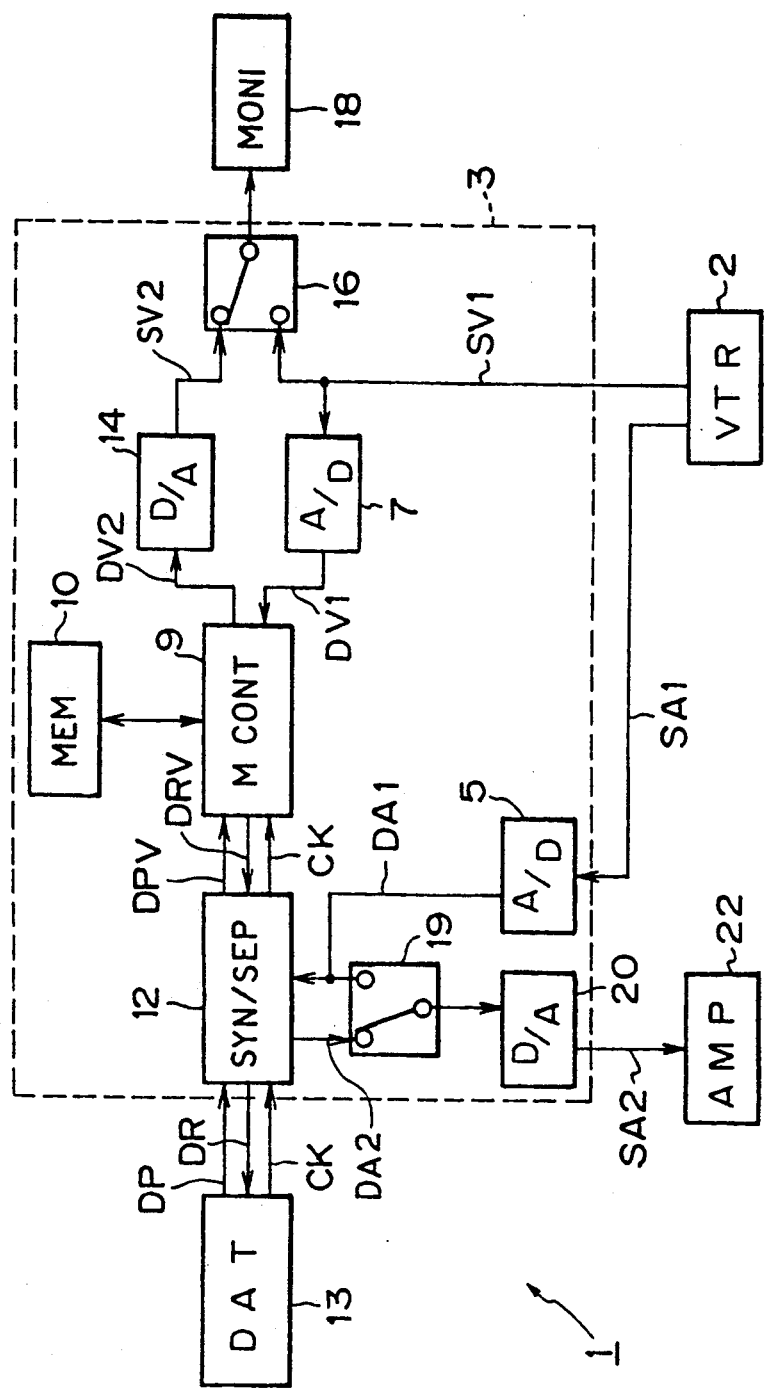
FIG. 1 is a block diagram showing a stationary image recording apparatus according to an embodiment of the present invention.

Preferred embodiments of this invention will be described with reference to the accompanying drawings:

In FIG. 1, 1 depicts a stationary image recording device as a whole, in which an audio signal SA1 and a video signal SV1 outputted from a video tape recorder (VTR) 2 as a signal source are processed in a preprocessing circuit 3 to be recorded on a magnetic tape.

The preprocessing circuit 3 supplies the audio signal SA1 and the video signal SV1 to analog to digital conversion circuits (A/D) 5 and 7 to convert them into a digital audio signal DA1 and a digital video signal DV1, respectively.

A memory control circuit 9, in recording, accumulates the digital video signal DV1 in a sequential memory circuit 10 and outputs it as a digital video signal DRV to a synthesizing and separating circuit 12 at a transmission rate of about 1.5 [Mbps].

Against this, the memory control circuit 9, in reproduction, accumulates the digital video signal DPV outputted from the synthesizing and separating circuit 12 in the memory circuit 10 and when the accumulation corresponds to one frame, outputs them sequentially to a digital conversion circuit (D/A) 14 at a predetermined transmission rate as a digital video signal DV2.

By this, the stationary image recording device 1 outputs the video signal SV2 or SV1 outputted from the digital to analog conversion circuit 14 or the video tape recorder 2 through a selector circuit 16 to a monitor 18 selectively so that a video signal recorded or reproduced can be monitored.

The synthesizing and separating circuit 12, in recording, receives a digital video signal DRV outputted from the memory control circuit 9 together with the digital audio signal DA1 and outputs them to a digital audio tape recorder (DAT) 13.

In this case, as shown in FIGS. 2A and 2B, the synthesizing and separating circuit 12 synthesizes the right and left channel signals (indicated by symbols L and R) of the digital audio signal and the digital video signal DRV (indicated by symbol V) to produce a recording signal DR.

That is, in a digital audio signal DN (FIG. 2A) standardized for the digital audio tape recorder (DAT), right and left channels are alternatively successive on the basis of a sampling frequency of 48 [kHz], while the synthesizing and separating circuit 12 arranges the right and left channel digital audio signal DA1 successively on the basis of a frequency of 96 [kHz] twice the sampling frequency described above. Subsequently the recording signal DR (FIG. 2B) is formed so that the digital video signal DV1 succeeds the signal DA1.

Further, in this case, the synthesizing and separating circuit 12 outputs the recording signal DR at a transmission rate of 3.06 [Mbps] which is approximately twice the usual transmission rate of 1.5 [Mbps].

By this, in the preprocessing circuit 3, the digital audio signal DA1 is output to the digital audio tape recorder at a transmission rate twice the usual rate and outputs the digital video signal DV1 is output at the same transmission rate as that of the digital audio signal DA1.

Against this, the synthesizing and separating circuit 12 in the reproduction process converts the reproduction signal DP output from the digital audio tape recorder 13 in the reverse manner relative to recording and outputs it as a digital video signal DPV and a digital audio signal DA2 separately.

By this, it is possible to monitor the video signal SV2 reproduced by the digital audio tape recorder 13 through the preprocessing circuit 3.

Further, by converting the reproduced digital audio signal DA2 in to an analog signal through a selector circuit 19 and a digital to analog conversion circuit (D/A) 20 and outputting it to an amplifier (AMP) 22, it is possible to monitor the reproduced digital audio signal.

Further, according to demand, the digital audio signal DA1 being recorded can be monitored instead of the reproduced digital audio signal, by switching contacts of the selector circuit 19.

FIG. 3 shows the arrangement of the digital audio tape recorder 13. In recording, a digital signal processing circuit (DSP) 26 converts the recording signal DR inputted sequentially thereto into a signal to be sequentially recorded on the magnetic tape 28. In reproduction, the digital signal processing circuit (DSP) 26 outputs a reproduction signal SP which is obtained from a signal sequentially reproduced from the magnetic tape 28.

The digital audio tape recorder 13 switches its operation mode corresponding to a control information DC from a system control circuit 25. In this embodiment, the system control circuit 25 operates at a processing speed twice that in the case of the usual process.

The digital signal processing circuit 26 outputs a reference signal DREF to the servo circuit 40 described below, a clock signal CK for the reference to the preprocessing circuit 3 and, in recording, stores the recording signal DR in the memory circuit 30, sequentially.

In this case, the digital signal processing circuit (DSP) 26 operates at a processing speed twice the usual processing speed and processes the recording signal DR in synchronism with the preprocessing circuit 3 through the use of the clock signal CK.

By this, in the digital signal processing circuit 26, the digital audio signal DA1 and the digital video signal DRV sequentially inputted at a time frame of 96 [kHz] are stored in predetermined regions of the memory circuit 30 and thus data is interleaved for example at every 15 [msec] time period.

Further, at this time, the digital signal processing circuit 26 assigns the digital audio signal DA1 and the digital video signal DRV to data memory regions of the memory circuit 30 where the right and left channels of the digital audio signal should be assigned in an ordinary interleave process (interleaved with every 30 [msec] time period, usually) and interleaves them, by processing the recording signal DR at a processing rate twice the processing rate of the preprocessing circuit 3 synchronously therewith.

Further, the digital signal processing circuit 26 produces a parity sign for check and correction of errors in the recording signal DR stored in the memory circuit 30 and then 8-10 modulates the parity sign and the recording signal DR and outputs it to an amplifier circuit (AMP) 32.

The amplifier circuit 32, in recording, amplifies the recording signal SR outputted from the digital signal processing circuit 26 and outputs it to the magnetic heads 38A and 38B.

At this time, the rotary drum 34 is driven by a servo circuit 40 to rotate at a rotation speed twice its ordinary rotation speed.

The magnetic tape 28 runs under control of the servo circuit 40 at a running speed twice its ordinary running speed, as is the rotary drum 34.

Further, the magnetic tape 28 runs while wound on the rotary drum 34 by a length corresponding to 90°. The magnetic heads 38A and 38B are mounted on the rotary drum 34 with an angular interval of 180°.

Figure 4:
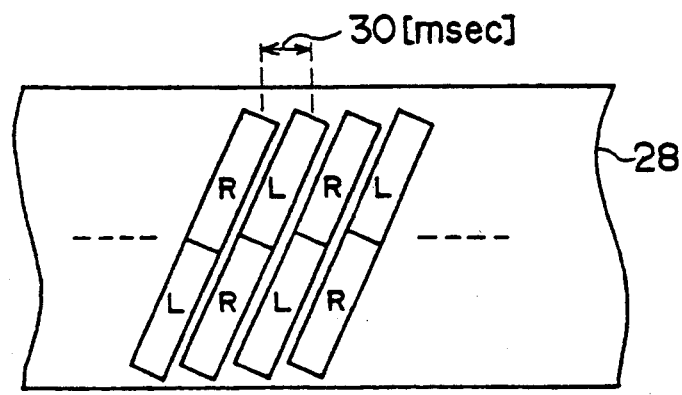
FIG. 4 shows a recording format of an existing digital audio tape recorder.

FIG. 4 is a recording signal pattern shown in a case where signals are recorded at the usual recording speed on the magnetic tape. In an existing digital audio tape recorder, the magnetic tape 28 and the rotary head 34 are driven at the usual speed. That is, the digital audio signal of the sampling frequency of 48 [kHz] is recorded according to the format standardized for the digital audio tape recorder (DAT).

The respective recording track is divided into 2 sections in the longitudinal direction and the digital audio signal is recorded sequentially with a 30 [msec] time period such that the right and left channels alternate.

Figure 5:
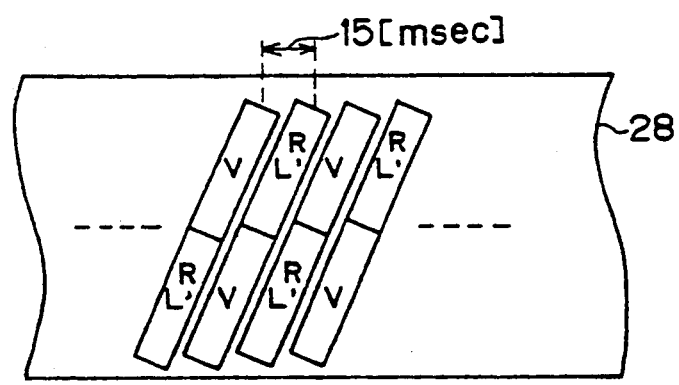
FIG. 5 shows a recording format of this embodiment.

FIG. 5 is a data recording pattern on the magnetic tape in the embodiment according to the present invention.

When, as in this embodiment, the data is processed at the rate twice the ordinary case and the digital audio signal DA1 and the digital video signal DV1 are converted into the recording signal DR by assigning them to the right and left channels, respectively, it is possible to record the digital audio signal DA1 and the digital video signal DV1 sequentially on the magnetic tape 28.

That is, in the magnetic tape 28, each recording track is divided into 2 regions in the longitudinal direction so that the digital audio signal DA1 for the right channel and the left channel is recorded on the one of the regions and the digital video signal DV1 is recorded with every 15 [msec] time period on the other of the regions.

Further, at this time, the recording regions for the digital audio signal DA1 and the digital video signal DV1 are arranged alternately according to the recording format of the digital audio tape recorder.

By doing so, it is possible to record the digital audio signal DA1 at a rate twice the ordinary rate through the magnetic tape running system driven at a rate twice the ordinary rate of the digital audio tape recorder.

As a result it is possible to assign, to the digital audio signal DA1 the same data amount as can be assigned to the ordinary digital audio tape recorder.

Further, as to the signal processing format itself, it can be processed in the same manner as in ordinary digital audio tape recorder. Thereby the digital audio signal DA1 can be recorded without tone quality degradation of the audio signal.

The digital video signal DV1 can be recorded at a rate of 1.536 [Mbps] assigned to the right and left channels of the ordinary digital audio tape recorder. Therefore, the video signal can be recorded together with the digital audio signal.

Against this, in reproduction, the digital signal processing circuit 26 receives the reproduction signal SP outputted from the magnetic heads 38A and 38B through the amplifier circuit 32 and outputs them after sequential demodulation.

That is, the digital signal processing circuit 26 derives the reproduction clock from the reproduction signal SP and then demodulates the reproduction signal SP on the basis of the reproduction clock.

Further, the digital signal processing circuit 26 stores the reproduction data demodulated in the memory circuit 30, performs the error check and correction. Subsequently the digital signal processing circuit performs a reverse-interleave processing and outputs a resultant reproduction signal DP to the preprocessing circuit 3.

By this, the reproduced digital audio signal SA2 and the digital video signal SV2 are outputted to the monitor 18 through the preprocessing circuit 3.

The tracking control circuit 42 derives a pilot signal from the reproduction signal SP for tracking control and a tracking error signal ER is produced on the basis of ATF (automatic track finding).

By this, in the digital audio tape recorder 13, the servo circuit 40 controls the magnetic tape running system according to the tracking error signal ER so that the tracking control is performed reliably.

In the construction mentioned hereinbefore, in recording, the video signal SV1 is converted by the analog to digital conversion circuit 7 into the digital video signal DV1 and then outputted at the predetermined transmission rate through the memory control circuit 9.

On the other hand, the audio signal SA1 is converted by the analog to digital conversion circuit 5 into the digital audio signal DA1 and then synthesized by the synthesizing and separating circuit 12 with the digital video signal DV1.

At this time, the digital video signal DV1 is synthesized with the digital audio signal DA1 such that these signals are alternate continuously continuous with a predetermined time period in synchronism with the operation of the digital audio tape recorder 13, resulting in the recording signal DR whose transmission rate is twice compared with the ordinary digital audio tape recorder and whose digital audio signal DA1 and the digital video signal DV1 are assigned to the right and left channels, respectively.

The recording signal DR is outputted to the digital audio tape recorder 13 operating at the processing rate twice the ordinary one and after being interleaved is recorded sequentially on the magnetic tape 28 together with the error check and correction sign.

Thus, by recording the digital audio signal DA1 by means of the digital audio tape recorder 13 by converting at twice the transmission rate and operating at twice the processing rate, there is no tone quality degradation of the digital audio signal DA1.

Further, it is possible to assign to the digital video signal DV1 the same information amount as that of the digital audio signal DA1 and record it on the magnetic tape.

In reproduction, the reproduction signal SP outputted from the magnetic heads 38A and 38B is demodulated by the digital signal processing circuit 26 and outputted sequentially to the preprocessing circuit 3.

By this, the reproduction signal DP from the digital signal processing circuit 26 is separated to the digital audio signal DA2 and the digital video signal DV2 in reverse fashion to the recording and then outputted to the amplifier 22 and the monitor 18, with the result that the audio signal and video signal can be recorded and reproduced easily.

Further, the magnetic tape recorded by the ordinary digital audio tape recorder can be easily reproduced by merely switching the operating rate of the digital audio tape recorder 13.

Although, in the above mentioned embodiment, the present invention was described as applied to recording and reproducing a stationary image, the present invention is not limited thereto and is applicable to a recording and reproducing a moving image.

In such case, by providing a video signal compression and expansion circuit instead of the memory control circuit 9 and the memory circuit 10, the moving image can be more effectively recorded and reproduced.

While there has been described hereinabove the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. Apparatus for causing a magnetic recording and reproducing apparatus to record both audio and video signals input thereto on sequential slant tracks on a tape formed by a rotary drum having a magnetic head rotating at a predetermined rotation speed relative to the tape wrapped therearound and moving at a predetermined running speed, so that both audio and video signals are recorded in each of the sequential slant tracks, comprising:

a system control circuit;

a signal preprocessing circuit for preprocessing the audio and video signals to be recorded and including means for receiving a left and right channel audio signal and a stationary image video signal for recording, memory means for accumulating the received video signal and outputting an accumulated video signal at a predetermined transmission rate, and synthesizing and separating means receiving the left and right channel audio signal from said means for receiving and the accumulated video signal from said memory means for producing a synthesized combined audio and video signal for recording having the left and right channel audio signal and the accumulated video signal alternately successively arranged and output in a recording signal at a predetermined transmission rate twice the transmission rate of the output of said memory means;

a servo circuit responsive to said system control circuit and connected to said rotating head and tape drive for causing said head to rotate at a high speed substantially twice said predetermined rotation speed and for causing said tape to run at a high running speed substantially twice said predetermined running speed, so that said tracks are formed on said tape in such a manner that said tracks have a pitch substantially equal to 15 msec; and digital signal processing means responsive to said system control circuit and receiving said synthesized combined audio and video signal for recording from said synthesizing and separating means for producing an output signal fed to the rotary magnetic head rotating at the high speed for recording in slant tracks on the magnetic tape running at the high running speed so that the left and right audio signal and the video signal are alternately recorded in respective first and second portions of each successive slant track on the magnetic tape.

2. Apparatus for adapting a digital audio tape recorder and playback unit to record and playback a stationary image video signal along with left and right channel audio signals in successive slant tracks on a magnetic tape wound around a drum having a rotary magnetic head, in which the digital audio tape recorder and playback unit causes the magnetic tape to move at a predetermined running speed and the rotary magnetic head to rotate at a predetermined rotation speed when recording only left and right channel audio signals, the apparatus comprising:

means for receiving a left and right channel audio signal and a video signal for recording;

memory means for accumulating the received video signal and outputting an accumulated video signal at a predetermined transmission rate;

synthesizing and separating means receiving the left and right channel audio signal from said means for receiving and the accumulated video signal from said memory means for producing a synthesized combined audio and video signal for recording in which the left and right channel audio signal and the accumulated video signal are alternately successively arranged and output in a recording signal at a predetermined transmission rate twice the transmission rate of the output of said memory means; and wherein the digital audio tape recorder and playback unit includes a system control circuit, servo means responsive to said system control circuit for causing said rotary drum to rotate at a high speed twice the predetermined rotation speed and for causing the magnetic tape to run at a high running speed twice the predetermined running speed, and digital signal processing means responsive to said system control circuit receiving said synthesized combined audio and video signal for recording from said synthesizing and separating means for producing an output signal fed to the rotary magnetic head rotating at the high speed for recording in slant tracks on the magnetic tape running at the high speed so that the left and right audio signal and the video signal are alternately recorded in respective first and second portions of each successive slant track on the magnetic tape.

3. The magnetic recording and reproducing apparatus according to claim 2 wherein said means for receiving includes means for analog to digital converting an analog audio signal received thereby for recording.

4. The magnetic recording and reproducing apparatus according to claim 2 wherein said means for receiving includes means for analog to digital converting an analog video signal received thereby for recording.

5. The magnetic recording and reproducing apparatus according to claim 2 wherein said predetermined transmission rate from said memory means in substantially equal to 1.5 Mbps and said predetermined transmission rate of said synthesized signal from said synthesizing and separating means is substantially equal to 3.06 Mbps.

* * * * *